US 7,298,730 B2

(12) United States Patent
Wu

(10) Patent No.: US 7,298,730 B2
(45) Date of Patent: Nov. 20, 2007

(54) SCHEME TO PREVENT HFN UN-SYNCHRONIZATION FOR UM RLC IN A HIGH SPEED WIRELESS COMMUNICATION SYSTEM

(75) Inventor: Chih-Hsiang Wu, Hsin-Tien (TW)

(73) Assignees: ASUSTeK Computer, Inc., Taipei (TW); Innovative Sonic Limited, Tortola (VG)

( * ) Notice: Subject to any disclaimer, the term of this patent is extended or adjusted under 35 U.S.C. 154(b) by 940 days.

(21) Appl. No.: 10/374,235

(22) Filed: Feb. 25, 2003

(65) Prior Publication Data

US 2005/0073987 A1    Apr. 7, 2005

Related U.S. Application Data

(60) Provisional application No. 60/368,286, filed on Mar. 28, 2002.

(51) Int. Cl.
*H04J 3/24* (2006.01)

(52) U.S. Cl. ............... 370/349; 714/748; 370/392

(58) Field of Classification Search ........ 370/392, 370/349, 474, 335, 338, 394, 329, 342, 341, 370/431, 441, 468, 469; 714/748, 751
See application file for complete search history.

(56) References Cited

U.S. PATENT DOCUMENTS 7,054,316 B2 *   5/2006   Cheng et al. ............ 370/394
7,130,295 B2 *  10/2006   Kim et al. ............... 370/349

* cited by examiner

*Primary Examiner*—Chi Pham
*Assistant Examiner*—Alexander O. Boakye
(74) *Attorney, Agent, or Firm*—Birch, Stewart, Kolasch & Birch, LLP

(57) ABSTRACT

When the system receives a request to switch for using a smaller TBS size, instead of discarding the unacknowledged MAC-hs PDUs, this invention will pick up RLC UM PDUs or RLC AM PDUs or both of them from the unacknowledged MAC-hs PDUs affected by the size change request and reload them into the new PDU. Meantime, this invention will select RLC UM PDUs over RLC AM PDUs to load into the new PDU if the unacknowledged MAC-hs PDU contains both of them. Therefore, this invention reduces the risk of loss of synchronization for UM RLC because the discarding of unacknowledged MAC-hs PDUs according to the prior art.

14 Claims, 8 Drawing Sheets

SCHEME TO PREVENT HFN UN-SYNCHRONIZATION FOR UM RLC IN A HIGH SPEED WIRELESS COMMUNICATION SYSTEM

CROSS REFERENCE APPLICATION

This application claims priority from U.S. Provisional Patent Application No. 60/368,286 filed on Mar. 28, 2002.

BACKGROUND

This invention relates to HSDPA in a wireless communication system. More particularly, this invention prevents the losing synchronization for UM RLC when the communication switches to use a smaller TBS. size.

The High Speed Downlink Packet Access (HSDPA) between UTRAN and UEs is based on techniques, such as HARQ (Hybrid Automatic Repeat Request) transmission and reception protocol used on HS-DSCH (High Speed Downlink Shared Channel) and adaptive modulation to achieve high throughput, reduce delay and high peak rates. The new functionality of hybrid ARQ and HSDPA scheduling are included in the MAC layer as shown in FIGS. 1, 2 and 4.

At the transmitter side—an UTRAN, the HARQ functions are included and controlled in a new entity called MAC-hs located in Node B as shown in FIG. 5. Such HARQ functions include a scheduler, HARQ entity, and HARQ process. A scheduler schedules MAC-hs SDUs for all connected UEs within a cell. The scheduler determines the HARQ Entity and the queue to be serviced and services priority queues. Meantime, the scheduler will indicate each sending MAC-hs PDU with a Queue ID and a Transmission Sequence Number (TSN) to the HARQ entity; the scheduler also schedules new transmissions, retransmission, determines a suitable redundancy version for each transmitted and retransmitted MAC-hs PDU and indicates the redundancy version to lower layer.

Next, there is one HARQ entity assigned to an UE in the UTRAN. The HARQ entity sets both the Queue ID and the TSN in transmitted MAC-hs PDUs. The TSN will be incremented for each subsequent transmitted MAC-hs PDU on a HS-DSCH. In addition, the HARQ entity determines a suitable HARQ process to service the MAC-hs PDU and sets the HARQ process identifier accordingly. Meantime, the UTRAN's HARQ process sets the New Data Indicator for the transmitted MAC-hs PDUs. The system sets the New Data Indicator to the value "0" for the first MAC-hs PDU transmitted by a HARQ process. The system increments the New Data Indicator by one for each subsequent transmitted MAC-hs PDU containing new data, while it does not increment the New Data Indicator if the MAC-hs PDU is a retransmission one.

Furthermore, the MAC layer uses MAC-hs PDU as the basic data structure to communicate with its upper or below layers or between the transmitter and the receiver. FIG. 6 illustrates the detail format of such MAC-hs PDU where a regular MAC-hs PDU includes a MAC-hs header, a plurality of MAC-hs SDUs and optional padding field. The system uses a variable size of PDU for transmission. There is a trade-off between using the larger size of Transport Block Set (TBS.) vs. the degree of robust. The system can transmit a MAC-hs PDU with its maximum size, which includes maximum number of MAC-hs SDUs (Service Data Units) in one PDU under the environment of requiring the least degree of robust. When the transmitting condition changes, the size of PDU, which in turn means the number of SDUs carried in one PDU, has to be reduced to ensure a more robust transmission.

At the receiver, a UE, to support the HARQ protocol, the HSDPA requires the support of functionality of HARQ Entity, HARQ process, reordering buffers and disassembly Entity. As shown in FIGS. 4 and 5, one UE has only one HARQ entity while supports a number of parallel HARQ processes. The HARQ Entity processes the HARQ process identifiers received on HS-SCCH. And based on the HARQ process identifier, the HARQ entity allocates the received MAC-hs PDU to the corresponding HARQ process.

At the same time, if the New Data Indicator of the new received MAC-hs PDU has been incremented compared to the value in the previous received transmission in this HARQ process or this is the first received transmission in the HARQ process, the UE shall replace the data currently in the soft buffer for this HARQ process with the received data. On the other hand, if the New Data Indicator is identical to the value used in the previous received transmission in the HARQ process, the UE shall combine the received data with the data currently in the soft buffer for this HARQ process. Later, if the data in the soft buffer has been successfully decoded and no error was detected, the UE delivers the decoded MAC-hs PDU to the reordering entity and generates a positive acknowledgment (ACK) of the data in this HARQ process. Otherwise, the UE should generate a negative acknowledgment (NAK) of the data in this HARQ process and report it to the transmitter. Moreover, the UE's HARQ process processes the Queue ID of the received MAC-hs PDUs and forwards the received MAC-hs PDUs to the reordering queue distribution entity. The reordering queue distribution function routes the MAC-hs PDUs to the correct reordering buffer based on the Queue ID.

Later, the reordering entity reorders received MAC-hs PDUs according to the received TSN. MAC-hs PDUs with consecutive TSNs are delivered to the disassembly function upon reception. MAC-hs PDUs are not delivered to the disassembly function if MAC-hs PDUs with lower TSN are missing. There is one reordering entity for each Queue ID configured at the UE. The reordering entity can use a Timer based stall avoidance mechanism or a Window based stall avoidance mechanism or both of them to manage its reordering buffer. Through the disassembly function, the UE shall remove any padding bits if present and the MAC-hs header, then deliver the MAC-d PDUs in the MAC-hs PDU to MAC-d.

Meantime, the system uses several ways to handling its most frequent encountered transmission errors: First, a NACK is detected as an ACK. The NW (Network) starts afresh with new data in the HARQ process where the data block is discarded in the NW and is lost. Retransmission of the discarded data block is left up to higher layers. Second, an ACK is detected as a NACK. If the network retransmits the data block, the UE will re-send an ACK to the network. In this case the transmitter sends an abort indicator by incrementing the New Packet Indicator, the receiver will continue to process the data block as in the normal case. Third, the NW implements an automatic default NACK return if the system sets up a threshold to detect lost status message. And last, if a CRC error happened on the HS-SCCH, UE receives no data and sends no status report. If the absence of the status report is detected, NW can retransmit the data block.

Usually, the system uses a tradeoff scheme between the size of Transport Block Set (TBS.) and the degree of robust for data transmission. In the least robust modulation and coding scheme (MCS) condition within the TTI (Transmission Timing Interval), the system uses the largest TBS. size of MAC-hs PDU to maximum data transmission rate. When radio condition changes while a more robust MCS is required for successful transmission, instead of using the largest TBS. size of a maximum date rate, the system has to switch to use a smaller TBS. size for a slower data rate within the TTI.

Nevertheless, according to the prior art, every time the system switches from operating at the higher data rate with a larger TBS. size to use a smaller size of MAC-hs PDU for a more robust MCS requirement, all outstanding MAC-hs PDUs in HARQ processes that have not been positively acknowledged will be discarded. The discarding of the MAC-hs PDUs definitely causes system inefficiency and latency that requires effects from higher layers of the transmitter to recovery these discarded data blocks.

The problems of the prior art can be further illustrated in the following two examples. First, assume that a UE's HARQ entity has six HARQ processes and is using the largest MAC-hs PDU size for transmission. Process 1 to 6 transmits MAC-hs PDUs with TSN 0 to 5 to UE respectively. After the first transmission of each process, the transmitter receives positive acknowledgments for MAC-hs PDUs with TSN=0, 2, 4 and 5 and negative acknowledgments for MAC-hs PDUs with TSN=1 and 3. Before starting the second transmission of each process, due to the change of radio conditions, the system has to use a smaller TBS. size for MAC-hs PDU size. According to the prior art, MAC-hs PDUs with TSN=1 and 3 will be discarded, so are dozens of RLC PDUs contained in these two PDUs. If MAC-hs PDUs with TSN=1 and 3 contain RLC UM PDUs, these RLC UM PDUs are lost forever.

Second, again assume that the largest MAC-hs PDU size is used in the MAC-hs PDU and the HARQ entity of an UTRAN allocates six HARQ processes to transmit data to one UE. Each HARQ process is transmitting one MAC-hs PDU and none of them has not received any acknowledgment for its transmitted MAC-hs PDU. Due to the change of the radio conditions, now the MCS must switch to use a more robust MCS that means to use a smaller size of MAC-hs PDU for transmission. According to the prior art, the six MAC-hs PDUs transmitted without positively acknowledged must be all discarded because their sizes does not conform to the new MAC-hs PDU size. If the six pending MAC-hs PDUs include more than 128 consecutive UM PDUs all sent by the same UM RLC entity, the HFN synchronization of the peer UM entities will be lost. Consequently, all the following UM PDUs will not be deciphered correctly. The prior art has no mechanism in the RLC layer to handle this serious problem.

SUMMARY

There is a need to modify the prior art to prevent the chance to lose the synchronization of the peer UM entities and to save the system resource.

BRIEF DESCRIPTION OF THE DRAWINGS

Following drawings with reference numbers and exemplary embodiments are referenced for explanation purpose.

DETAIL DESCRIPTION OF THE INVENTION

When a request to switch to use a smaller size of a MAC-hs PDU happens, instead of discarding all unacknowledged MAC-hs PDUs (the unACKed PDU) in the HARQ process as the prior art does, this invention will pickup RLC PDUs of the discarding MAC-hs PDUs affected by the size change request in the HARQ process and repackaged them into the new smaller size MAC-hs PDUs that conforms to the new TBS. size. So that the new MAC-hs PDU includes at least a subset of the MAC-hs SDUs in the original MAC-hs PDU before being discarded. Because it is difficult to recover the RLC UM PDUs once they are discarded, when pick RLC PDUs from the unACKed PDUs to form the new MAC-hs PDUs (the new PDU), the invention will select the RLC UM PDUs over RLC AM PDUs from the unACKed PDU. This invention has two alternative approaches for selecting the RLC UM PDUs over the RLC AM PDUs.

Figure 1:
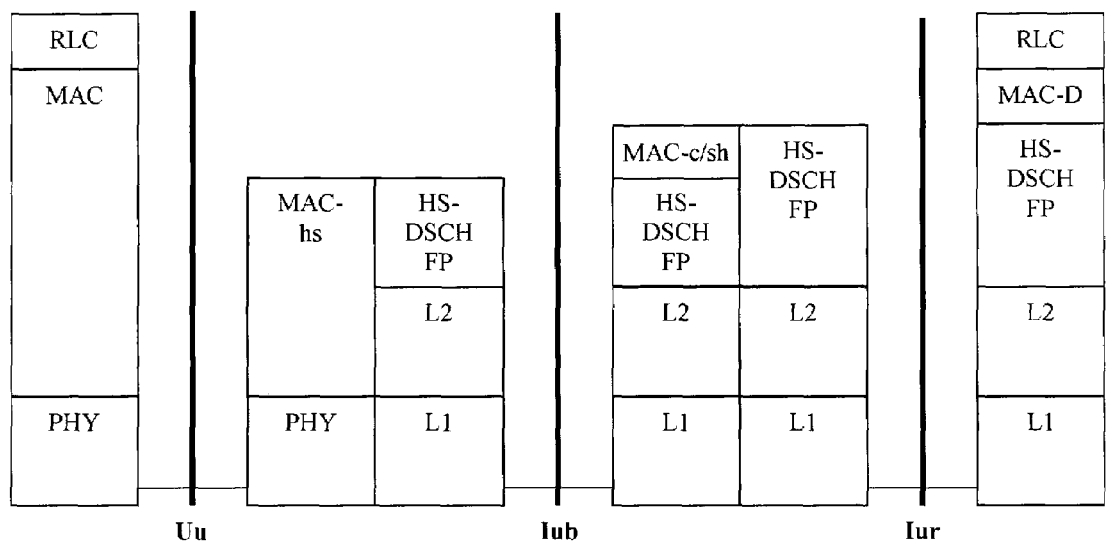
FIG. 1 illustrates the Protocol Architecture of HSDPA Configuration with MAC-c/sh.
Figure 2:
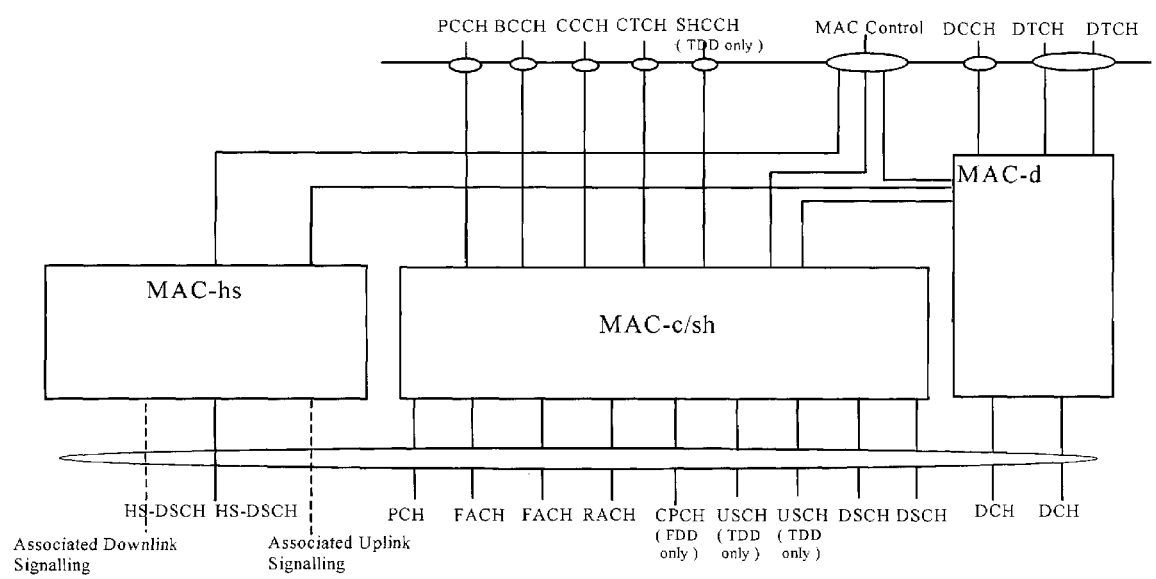
FIG. 2 illustrates the UE side MAC architecture with HSDPA.
Figure 3:
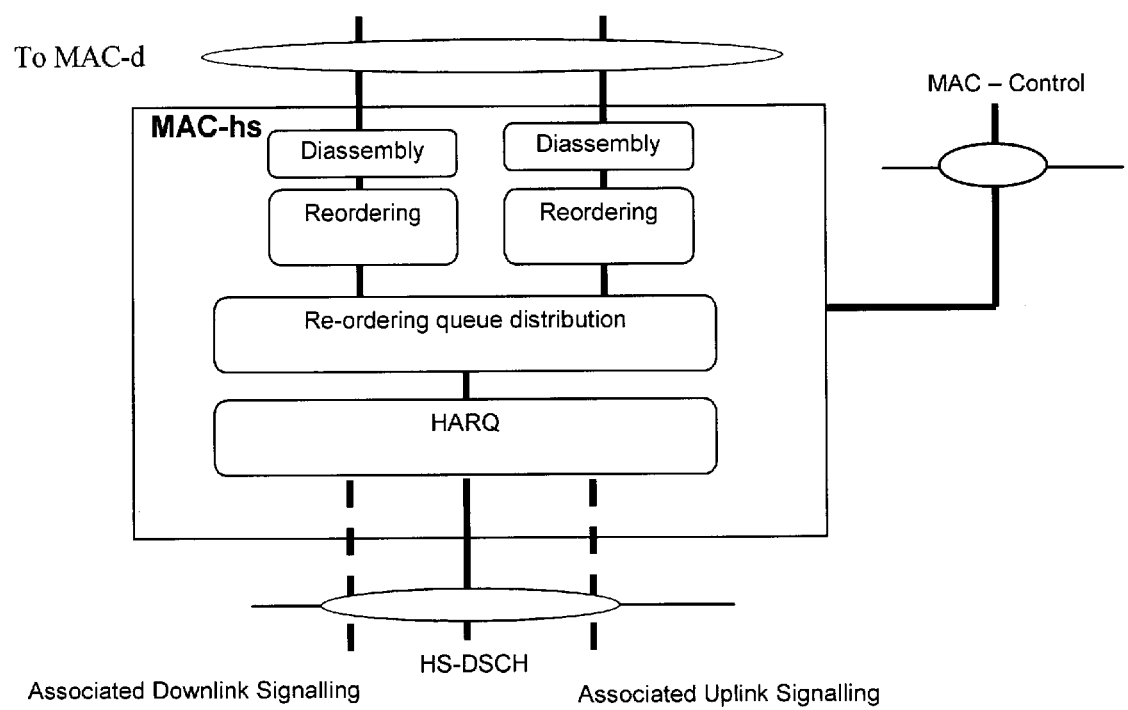
FIG. 3 illustrates the UE side MAC architecture/MAC-hs details.
Figure 4:
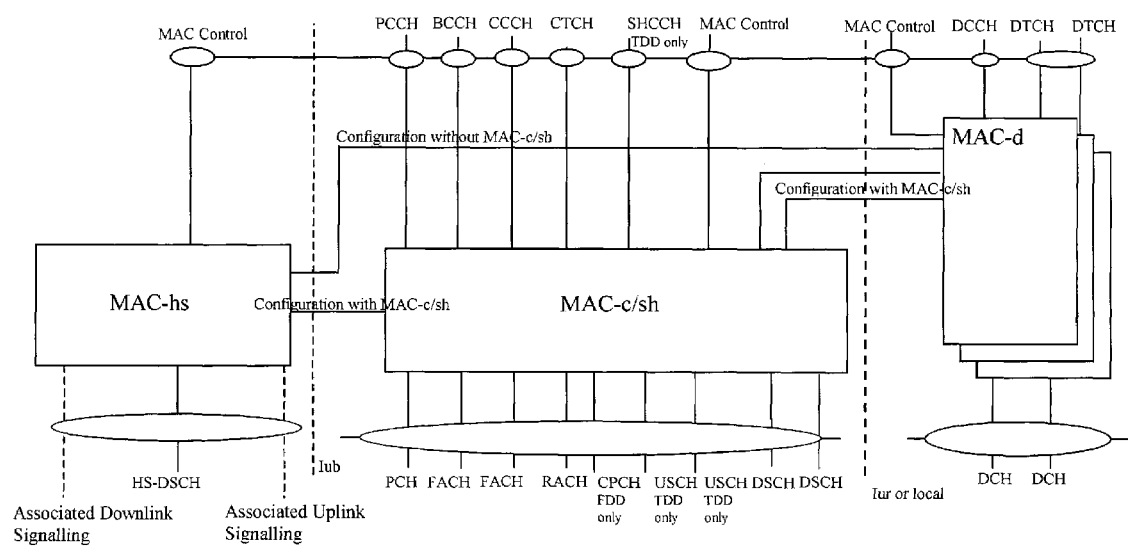
FIG. 4 illustrates the UTRAN side overall MAC architecture.
Figure 5:
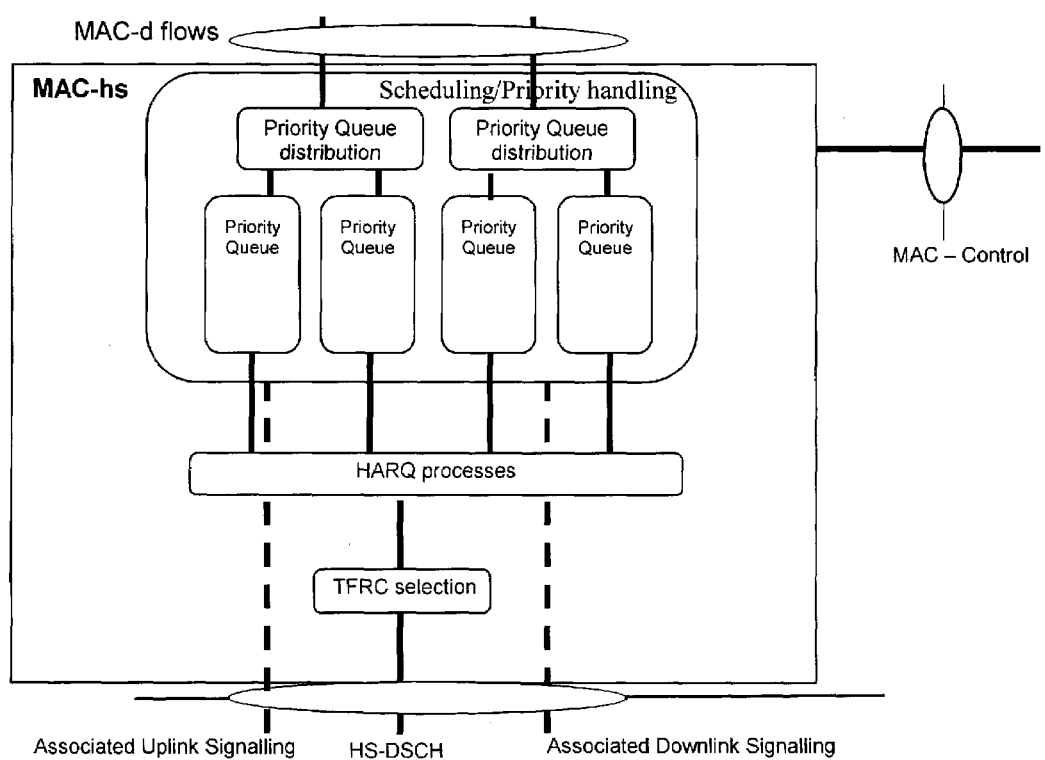
FIG. 5 illustrates the UTRAN side MAC architecture/MAC-hs details.
Figure 6:
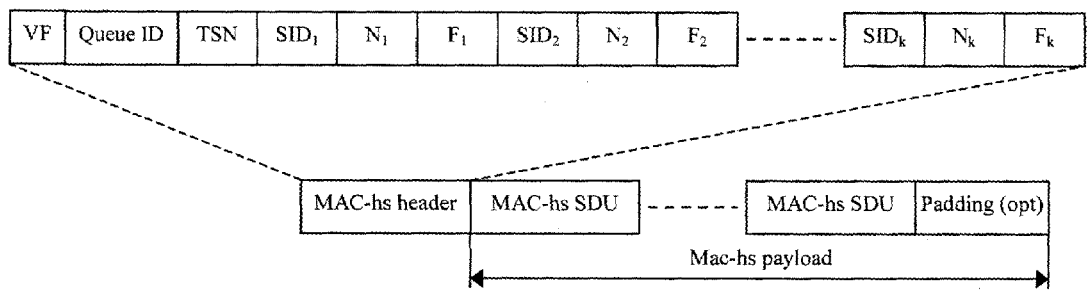
FIG. 6 illustrates the MAC-hs PDU format.
Figure 7:
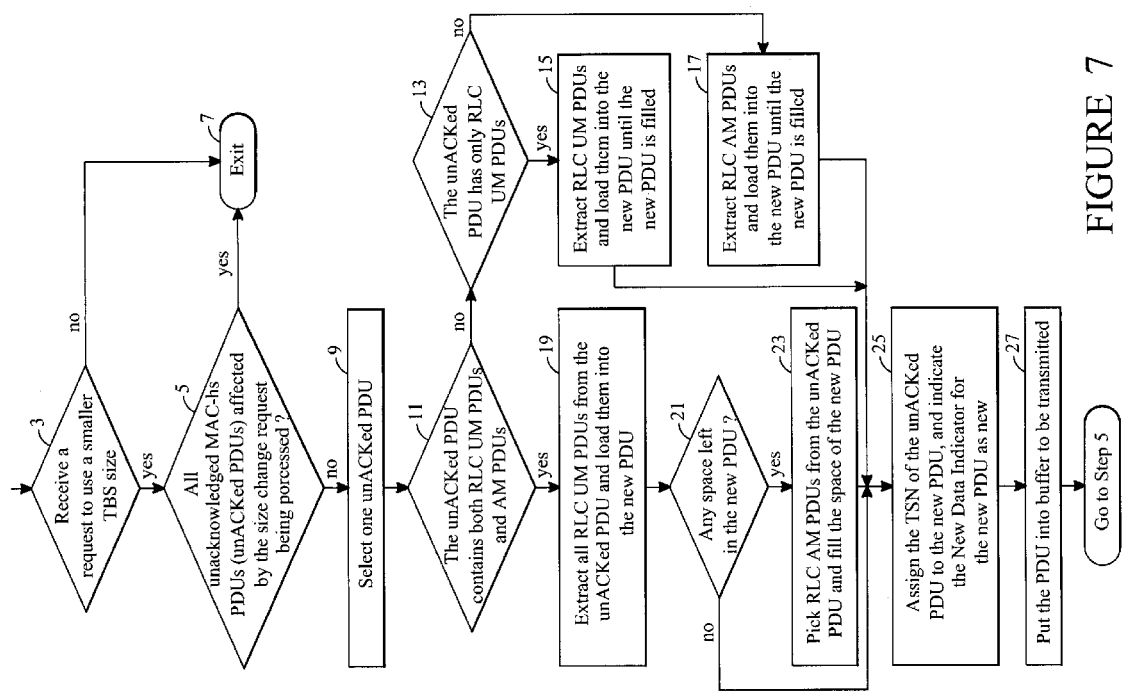
FIG. 7 illustrates the logic flowchart of this invention of how to construct a new MAC-hs PDU when receives a request to switch to use a smaller size MAC-hs PDU.

The logical flow of the first approach is shown in FIG. 7. The invention starts with one pending unACKed PDU but it will eventually process all unACKed PDUs affected by the size change request through. In the Step 3 of FIG. 7, upon receiving a request to switch to use a smaller TBS. size. The invention selects one of the unACKed PUDs (Steps 5 and 9), the invention first checks if the MAC-hs SDUs of the unACKed PDU contains both RLC UM PDUs and RLC AM PDUs (Step 11), if the SDU does contain both RLC UM PDUs and AM PDUs, then the invention will pick up the RLC UM PDUs from the unACKed PDU and loads them into the smaller size new PDUs (Step 19). After loading all RLC UM PDUs if there is more free space available in the new PDU, then selects more RLC AM PDUs of the unACKed PDU and loads them into the free space of the new PDU until there is no more free space (Steps 21 and 23). Next, the transmitter assigns the TSN of the unACKed PDU to the new PDU and indicates the New Data Indicator as new for the new PDU (Step 25). Now, as shown in Step 27, this new PDU is ready to be transmitted. Of course, if the unACKed PDU contains only RLC UM PDUs or only RLC AM PDUs, then the invention just picks the contains of the unACKed PDU and loads them into the new PDU until it is filled as shown in Steps 13, 15 and 17). Afterward, the new PDU will have the same TSN of the unACKed PDU and the New Data Indicator for the new PDU is indicated as new (Steps 25 and 27).

Figure 8:
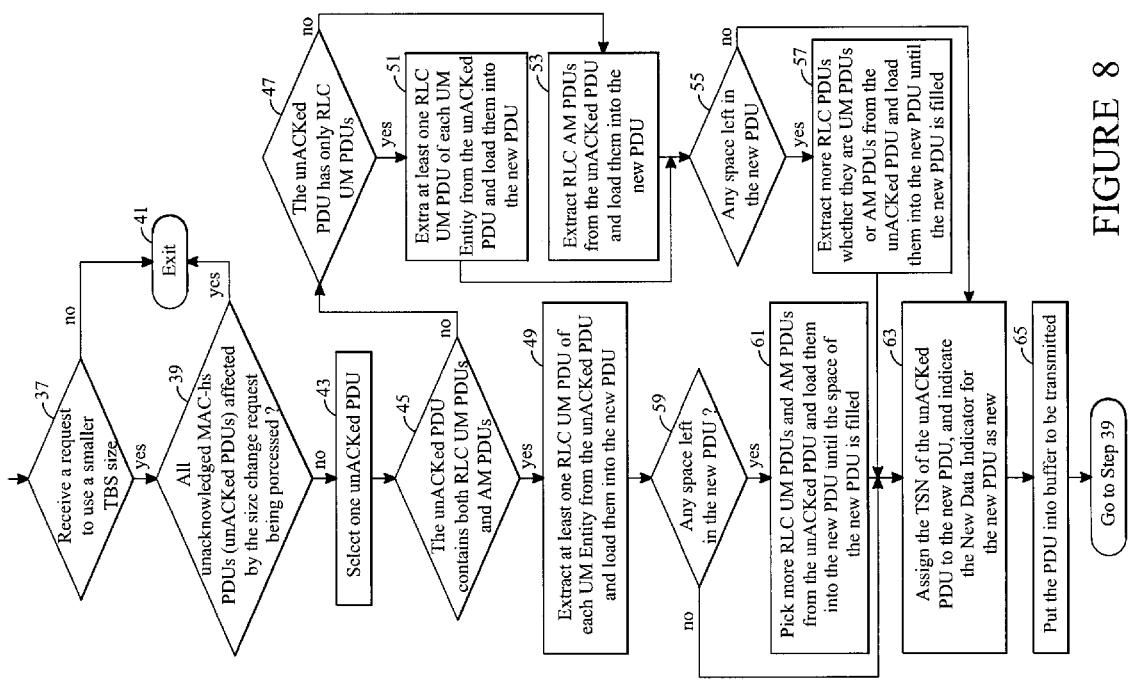
FIG. 8 illustrates another logic flowchart of this invention of how to construct a new MAC-hs PDU when receives a request to switch to use a smaller size MAC-hs PDU.

Next, refer to FIG. 8, it is the flowchart of the second approach of the invention. When the system receives a request to use a smaller TBS. size (Step 37), this process will apply to all unACKed PDUs affected by the size change request one at a time by selecting one of unACKed PDUs (Steps 39 and 43). The invention first checks if the MAC-hs SDUs of the unACKed PDU contains both RLC UM PDUs and RLC AM PDUs (Step 45), if the SDU does contain both, then the invention selects at least one RLC UM PDU of each RLC UM entities of the unACKed PDU and loads them into the new PDU (Step 49). If the new MAC-hs PDU still has free space afterward (Step 59), then selects other RLC UM PDUs and AM PDUs from the unACKed PDU to fill up the rest free space (Step 61). Meantime, assign the same TSN of the unACKed PDU to the new MAC-hs PDU while indicates the New Data Indicator for the new PDU as new (Step 63). Now, as shown in Step 65, this new PDU is ready to be transmitted. Then the same or a different HARQ process can be scheduled to transmit the new MAC-hs PDU with the PDU's New Data Indicator indicated as new. One way used to indicate the New Data Indicator as new is to set the New Data Indicator to the value "0" for the new MAC-hs PDU if the new MAC-hs PDU is the first MAC-hs PDU transmitted by a HARQ process and increment the New Data Indicator for the new MAC-hs PDU if the new MAC-hs PDU is not the first MAC-hs PDU transmitted by a HARQ process. If the unACKed PDU contains only RLC UM PDUs (Step 47), then this invention will extract at least one RLC UM PDU for each UM Entity and loads them into the new PDU (Step 51). Furthermore, if there is more free space left in the new PDU then extracts more RLC UM PDUs from the unACKed PDU and loads them into the new PDU until the new PDU is filled (Step 57). Meantime, if the unACKed PDU contains only RLC AM PDUs, then the invention extracts RLC AM PDUs and load them into the new PDU until the new PDU is filled (Steps 53, 55 and 57.) The new PDU will have the same TSN of the unACKed PDU and the New Data Indicator for the new PDU is indicated as new (Step 63). Then this new PDU is ready to be transmitted (Step 65).

This invention will prevent losing more than 128 consecutive UM PDUs belonging to a RLC UM entity during the switch. Therefore, the problem of HFN lost synchronization is avoided in the second example. Moreover, for example, a MAC-hs PDU with its TSN=100 that being transmitted in the HARQ process contains 10 RLC UM PDUs from one RLC UM entity and 20 RLC AM PDUs. Before this MAC-hs PDU is positively acknowledged, a more robust MCS is requested to switch to use a smaller size of MAC-hs PDU. This MAC-hs PDU needs to be reconstructed to a smaller MAC-hs PDU to conform to the new MCS requirement. If the new MAC-hs PDU can only contain 15 RLC PDUs, a subset of 30 RLC PDUs in the original MAC-hs PDU can be included in this new PDU. By using the first approach, the 15 RLC PDUs within the new MAC-hs PDU contain 10 RLC UM PDUs and 5 RLC AM PDUs. This new MAC-hs PDU is sent with the same TSN=100 and the associated New Data Indicator indicated as new. By using the second approach, at least one of the RLC UM PDUs is contained in the new MAC-hs PDU and the other space (14 PDUs) can be filled by the rest RLC UM PDUs and RLC AM PDUs according to the priority of the RLC entities.

What is claimed is:

1. A method to prevent hyper frame number (HFN) unsynchronization for unacknowledged mode (UM) radio link control (RLC) between a transmitter and a receiver in high speed downlink packet access (HSDPA) of a high speed wireless communication system; wherein the transmitter assigns a Transmission Sequence Number (TSN) to each sending data package and temporarily keeps the sent data package until receiving a corresponding response from the receiver, meanwhile due to the change of the communication condition, the system switches to use different sizes of data package—media access control-high speed (MAC-hs) protocol data unit (PDU) for transmitting, the method comprising the steps of:
at the transmitter:
receiving a request to switch using a smaller size data package, a new MAC-hs PDU to be transmitted;
until all unacknowledged MAC-hs PDUs have been processed, processing everyone of the unacknowledged MAC-hs PDUs affected by the size change request one at a time with the following steps a to f;
 a. extracting subsets from the contains of the unacknowledged MAC-hs PDU;
 b. filling up the new MAC-hs PDU with the extracted subsets;
 c. assigning the TSN of the unacknowledged MAC-hs PDU to the new MAC-hs PDU;
 d. indicating the new MAC-hs PDU containing new data;
 e. discarding the extracted unacknowledged MAC-hs PDU; and
 f. putting the new MAC-hs PDU ready to be transmitted.

2. The method as claimed in claim 1, wherein the extracted subsets are RLC PDUs containing either RLC UM PDUs or RLC AM PDUs or both of them.

3. The method as claimed in claim 2, wherein indicating the new MAC-hs PDU containing new data comprising the steps of:
setting the value of the New Data Indicator to the value "0" for the new MAC-hs PDU if the new MAC-hs PDU is the first MAC-hs PDU transmitted by a Hybrid Automatic Repeat Request (HARQ) process;
incrementing the value of the New Data Indicator with one for the new MAC-hs PDU if the new MAC-hs PDU is not the first MAC-hs PDU transmitted by a HARQ process; and
assigning the value to the New Data Indicator to the new MAC-hs PDU.

4. The method as claimed in claim 2, extracting subsets from the unacknowledged MAC-hs PDU further comprising the steps of:
selecting the RLC UM PDUs first if the unacknowledged MAC-hs PDU containing such PDUs; and
selecting the RLC AM PDUs if the new MAC-hs PDU has free space and if the unacknowledged MAC-hs PDU containing no RLC UM PDU or all UM PDUs have been extracted.

5. The method as claimed in claim 2, extracting subsets from the unacknowledged MAC-hs PDU further comprising the steps of: selecting at least one RLC UM PDU from every UM entity first if the unacknowledged MAC-hs PDU containing either both RLC UM PDUs and RLC AM PDUs or RLC UM PDUs only;
afterward selecting RLC PDUs from the rest of the unacknowledged MAC-hs PDU whether they are the RLC UM PDUs or the RLC AM PDUs if the new MAC-hs PDU has free space; and
selecting the RLC AM PDUs if the unacknowledged MAC-hs PDU containing only RLC AM PDUs and if the new MAC-hs PDU has free space.

6. The method as claimed in claim 5, wherein afterward selecting RLC PDUs further comprising of selecting RLC PDUs based on their priority.

7. A system having means for preventing hyper frame number (HFN) unsynchronization for unacknowledged mode (UM) radio link control (RLC) between a transmitter and a receiver in high speed downlink packet access (HSDPA) of a high speed wireless communication system; wherein the transmitter assigns a Transmission Sequence Number (TSN) to each sending data package and temporarily keeps the sent data package until receiving a corresponding response from the receiver, meanwhile due to the change of the communication condition, the system switches to use different sizes of data package—media access control-high speed (MAC-hs) protocol data unit (PDU) for transmitting, where the transmitter comprising:

means for receiving a request to switch using a smaller size data package, a new MAC-hs PDU to be transmitted;
means for processing every unacknowledged MAC-hs PDUs affected by the size change request;
means for extracting subsets from the contains of the unacknowledged MAC-hs PDU;
means for filling up the new MAC-hs PDU with the extracted subsets;
means for assigning the TSN of the unacknowledged MAC-hs PDU to the new MAC-hs PDU;
means for indicating the new MAC-hs PDU containing new data;
means for discarding the extracted unacknowledged MAC-hs PDU; and
means for putting the new MAC-hs PDU ready to be transmitted.

8. The system as claimed in claim 7, wherein means for extracting subsets where subsets are RLC PDUs containing either RLC UM PDUs or RLC AM PDUs or both of them.

9. The system as claimed in claim 8, wherein means for indicating the new MAC-hs PDU containing new data further comprising:
means for setting the value of the New Data Indicator to the value "0" for the new MAC-hs PDU if the new MAC-hs PDU is the first MAC-hs PDU transmitted by a Hybrid Automatic Repeat Request (HARQ) process;
means for incrementing the value of the New Data Indicator with one for the new MAC-hs PDU if the new MAC-hs PDU is not the first MAC-hs PDU transmitted by a HARQ process; and
means for assigning the incremented value to the New Data Indicator to the new MAC-hs PDU.

10. The system as claimed in claim 8, means for extracting subsets from the unacknowledged MAC-hs PDU further comprising:
means for selecting the RLC UM PDUs first if the unacknowledged MAC-hs PDU containing such PDUs; and
means for selecting the RLC AM PDUs if the new MAC-hs PDU has free space and if the unacknowledged MAC-hs PDU containing no RLC UM PDU or all UM PDUs have been extracted.

11. The system as claimed in claim 8, means for extracting subsets from the unacknowledged MAC-hs PDU further comprising:
means for selecting at least one RLC UM PDU from every UM entity first if the unacknowledged MAC-hs PDU containing either both RLC UM PDUs and RLC AM PDUs or RLC UM PDUs only;
means for selecting RLC PDUs afterward from the rest of the unacknowledged MAC-hs PDU whether they are the RLC UM PDUs or the RLC AM PDUs if the new MAC-hs PDU has free space; and
means for selecting the RLC AM PDUs if the unacknowledged MAC-hs PDU containing only RLC AM PDUs and if the new MAC-hs PDU has free space.

12. The system as claimed in claim 11, wherein means for selecting RLC PDUs afterward further comprising of selecting RLC PDUs based on their priority A transmitter having means for preventing HFN unsynchronization for UM RLC with a receiver in HSDPA of a high speed wireless communication system; wherein the transmitter assigns a Transmission Sequence Number (TSN) to each sending data package and temporarily keeps the sent data package until receiving a corresponding response from the receiver, meanwhile due to the change of the communication condition, the transmitter switches to use different sizes of data package—MAC-hs PDU for transmitting, where the transmitter comprising:

means for receiving a request to switch using a smaller size data package, a new MAC-hs PDU to be transmitted;
means for processing every unacknowledged MAC-hs PDUs affected by the size change request;
means for extracting subsets from the contains of the unacknowledged MAC-hs PDU;
means for filling up the new MAC-hs PDU with the extracted subsets;
means for assigning the TSN of the unacknowledged MAC-hs PDU to the new MAC-hs PDU;
means for indicating the new MAC-hs PDU containing new data;
means for discarding the extracted unacknowledged MAC-hs PDU; and
means for putting the new MAC-hs PDU ready to be transmitted.

13. A transmitter having means for preventing hyper frame number (HFN) unsynchronization for unacknowledged mode (UM) radio link control (RLC) with a receiver in high speed downlink packet access (HSDPA) of a high speed wireless communication system; wherein the transmitter assigns a Transmission Sequence Number (TSN) to each sending data package and temporarily keeps the sent data package until receiving a corresponding response from the receiver, meanwhile due to the change of the communication condition, the transmitter switches to use different sizes of data package—media access control-high speed (MAC-hs) protocol data unit (PDU) for transmitting, where the transmitter comprising:

means for receiving a request to switch using a smaller size data package, a new MAC-hs PDU to be transmitted;
means for processing every unacknowledged MAC-hs PDUs affected by the size change request;
means for extracting subsets from the contains of the unacknowledged MAC-hs PDU;
means for filling up the new MAC-hs PDU with the extracted subsets;
means for assigning the TSN of the unacknowledged MAC-hs PDU to the new MAC-hs PDU;
means for indicating the new MAC-hs PDU containing new data;
means for discarding the extracted unacknowledged MAC-hs PDU; and
means for putting the new MAC-hs PDU ready to be transmitted.

14. The transmitter as claimed in claim 13, means for extracting subsets from the unacknowledged MAC-hs PDU further comprising:
means for selecting at least one RLC UM PDU from every UM entity first if the unacknowledged MAC-hs PDU containing either both RLC UM PDUs and RLC AM PDUs or RLC UM PDUs only;
means for selecting RLC PDUs afterward from the rest of the unacknowledged MAC-hs PDU whether they are the RLC UM PDUs or the RLC AM PDUs if the new MAC-hs PDU has free space; and
means for selecting the RLC AM PDUs if the unacknowledged MAC-hs PDU containing only RLC AM PDUs and if the new MAC-hs PDU has free space.

* * * * *

UNITED STATES PATENT AND TRADEMARK OFFICE
CERTIFICATE OF CORRECTION

PATENT NO. : 7,298,730 B2  Page 1 of 1
APPLICATION NO. : 10/374235
DATED : November 20, 2007
INVENTOR(S) : Chih-Hsiang Wu It is certified that error appears in the above-identified patent and that said Letters Patent is hereby corrected as shown below:

Title Page Item 73, please change the Assignee's name from "Asutek Computer Inc, Taipei (TW) and Innovative Sonic Limited, Tortola (VG)" to -- Innovative Sonic Limited, Tortola (VG) --

Signed and Sealed this

Twenty-fourth Day of August, 2010

David J. Kappos
*Director of the United States Patent and Trademark Office*